UNITED STATES PATENT OFFICE.

WALTER SEYMOUR DOWNHAM, OF WHEATLEY, ONTARIO, CANADA, ASSIGNOR OF ONE-SIXTH TO ADAM THOMAS BELL AND ONE-SIXTH TO MICHAEL STEELE, BOTH OF TAVISTOCK, ONTARIO, CANADA.

WHEY EMULSION.

1,085,380. Specification of Letters Patent. Patented Jan. 27, 1914.

No Drawing. Application filed March 28, 1913. Serial No. 757,307.

*To all whom it may concern:*

Be it known that I, WALTER SEYMOUR DOWNHAM, of the hamlet of Wheatley, county of Kent, Province of Ontario, Canada, medical doctor, have invented certain new and useful Improvements in Whey Emulsions for Babies, Infants, and Invalids, of which the following is a specification.

This invention relates to the production of a whey emulsion made from sweet cow's milk, to be fed to babies, infants, and invalids, particularly invalids suffering from typhoid fever, stomach and intestinal troubles, kidney disease, heart trouble, and arterio sclerosis, and one of the objects of my invention is to provide a baby-food in the form of a whey emulsion, the prolonged use of which will not be accompanied by infantile scurvy.

Another object of my invention is to provide a whey emulsion for the market in which the spores are all killed, thus insuring a product of this class that will keep for an indefinite period.

A still further object of my invention is the production of a product of this class wherein the casein of cow's milk coagulates in the stomach in the form of a flocculent precipitate in which state it is very easily digested.

As is well known by one skilled in this art, the use of ordinary untreated casein of cow's milk, results in the formation of ropy curds, which are hard to digest, and which cause by their presence irritation producing various forms of stomach and bowel disorders, and cholera-infantum. Now by emulsifying the ingredients of my product, the casein is broken up into very small particles in which state it is very easily digested, and the envelops surrounding the fat globules are broken, thus liberating the fat particles which thoroughly mix with the other ingredients, and cannot be separated therefrom in the ordinary way, except to a small extent such as by means of a cream separator or by allowing the mixture to stand. It is very important that the covering surrounding the fat globules be broken so that the fat cannot again separate from the mixture in the form of cream, and, furthermore, to insure the fat being easily assimilated and digested. When my whey mixture is properly homogenized and emulsified, the fat globules or cream, and the casein, remain evenly distributed throughout the mixture for an indefinite period. By mixing with the ingredients of my product a suitable prophylactic agent, such as sodium citrate, the casein is acted upon in such a way that when taken into the stomach it will be coagulated in a flocculent form, in which state it ceases to be a cause of the disorders above noted.

This emulsion, for example in the case of babies, passes through the stomach and bowels free of all chunks of curd. I have found that it is a soothing nourishment in cases of ulcer of the stomach, and duodenum, and in gastritis.

It is very important to note that since there is no curdy residue deposited in the stomach and bowels as a result of the use of this emulsion, the conditions are absent which irritate and cause perforation of the inflamed and ulcerated Peyer's patches. Consequently it will be found that this emulsion can be well retained by patients suffering from typhoid fever.

By providing my emulsion with a suitable prophylactic agent, the casein, in the cow's sweet milk or cream used, is rendered in characteristics like the casein of human milk, which is flocculent and coagulable only in soft curds.

It is to be noted that this product is not a mechanical mixture of the various ingredients, but is a true emulsion.

In compounding the ingredients of this product, I obtain sweet whey either from cow's milk as it comes from the cow, or, from skimmed milk, and test the same to ascertain that it does not contain over a certain percentage of lactic acid, preferably 18%. To this sweet whey is added a certain amount of butter fat in the form of sweet cream. To this mixture is now added a certain percentage of milk sugar, or, as a substitute therefor, a certain percentage of cane sugar. Then a certain amount of a suitable prophylactic agent, such as sodium citrate, is added. The mixture is of course more or less stirred and then it is pasteurized, and after pasteurization it is passed through what is known as a homogenizing machine which emulsifies the ingredients thoroughly after the manner well known. As a result of such emulsification, the fat contained in the mixture thoroughly mixes with the other ingredients and cannot again be separated therefrom except with great difficulty, thus forming a substantially stable emulsion. The particles of the prophylatic agent are, as a consequence of said treatment, also broken up and emulsified, and are consequently readily digested.

So soon as the mixture has been made into an emulsion, it is cooled off and hermetically sealed in suitable receptacles and then sterilized in a temperature that will kill all spores therein, thus resulting in a product that will keep indefinitely. I find that by subjecting the emulsion to a temperature of from 225 degrees F. to 235 degrees F. and maintaining it in this temperature for approximately a half an hour, the spores will be killed. If desired, the casein may be introduced into the mixture as part of the sweet cream or as part of sweet skimmed milk.

During the compounding of the ingredients, sweet skimmed milk may be added to the whey and cream mixture in varying quantities, so that the mixture may contain from 25% to 75% of skimmed milk, provided it also contains from 1% to 3.5% of butter fat. This will enable me to provide my emulsion possessing varying percentages of casein so that the emulsion may be suitable as food for infants and invalids whose digestion is fairly good.

I shall now give below the relative proportions of the ingredients of my emulsion for babies and infants, as well as for invalids. The following ingredients compose one quart of the emulsion compounded to be fed to delicate infants. This quart contains the following ingredients in approximately the proportions mentioned; 99% sweet whey and 1% of butter fat, to which is added 20 grains of a suitable prophylactic agent, such as sodium citrate.

The following ingredients compose one quart of the emulsion compounded to be fed to babies and infants and invalids whose digestion is fairly good. This quart contains the following ingredients in approximately the proportions mentioned; 73% sweet whey; 2% butter fat; 1% of milk sugar, or, as a substitute therefor, one half of 1% of cane sugar, and skimmed milk to the amount of 25% which is equivalent to one half of 1% of casein. To the foregoing is added 30 grains of a suitable prophylactic agent, such as sodium citrate.

The following ingredients compose one quart of the emulsion compounded to be fed to healthy children. This quart contains the following ingredients in approximately the proportions mentioned; 36.5% sweet whey; 3.5% butter fat; 2% of milk sugar, or, as a substitute therefor, 1% of cane sugar, and skimmed milk to the amount of 60% which is equivalent to 1.2% casein. To the foregoing is added 40 grains of a suitable prophylactic agent, such as sodium citrate.

I may manufacture my emulsion in a concentrated form, and in order to do so it will be necessary to reduce the amount of moisture in the emulsion by boiling or evaporization, until the volume thereof is substantially one quarter to one eighth of its volume before boiling or evaporization.

The concentrated form is prepared for feeding by mixing water therewith according to the directions indicated on the receptacles containing the emulsion, until it is of the desired consistency.

My emulsion prepared according to formulæ 1 and 2 may be fed to adult patients suffering from typhoid fever, gastritis and indigestion.

What I claim as my invention is:

1. As a new article of manufacture a whey emulsion from which the fat particles cannot again be naturally nor mechanically separated except to a small extent, sterilized after being manufactured to form a sterile food.

2. As a new article of manufacture, a whey emulsion containing sweet whey; butter fat, and a suitable prophylactic agent.

3. As a new article of manufacture, a whey emulsion containing sweet whey; butter fat; milk sugar, skimmed milk and a suitable prophylactic agent.

4. As a new article of manufacture, a whey emulsion containing the following ingredients in approximately the proportions mentioned: 73% sweet whey; 2% butter fat; 1% milk sugar; 25% of skimmed milk and 30 grains of sodium citrate.

5. As a new article of manufacture, a whey emulsion composed of sweet whey; butter fat; a sugar; casein, and a prophylactic agent.

6. The process of manufacturing a food for infants and invalids which consists in taking the desired quantity of sweet whey; adding the desired amount of butter fat thereto, to which ingredients is added the required amount of a prophylactic agent; pasteurizing the compound and then emulsifying the same.

7. The process of manufacturing a food for infants and invalids which consists in taking the desired quantity of sweet whey; adding the desired amount of butter fat thereto, to which ingredients is added the required amount of a prophylactic agent;

pasteurizing the compound; emulsifying the same, and sterilizing the compound in hermetically sealed receptacles in a temperature that will kill all spores.

8. As a new article of manufacture, a substantially stable whey emulsion containing a prophylactic agent, made from cow's milk, the casein in which has been rendered in characteristics like the casein of human milk.

In testimony whereof I affix my signature in presence of two witnesses.

WALTER SEYMOUR DOWNHAM.

Witnesses:
G. CLEVELAND WAGNER,
CHAS. DUCHMANN.